(12) United States Patent
Bonds, Jr. et al.

(10) Patent No.: US 7,630,211 B2
(45) Date of Patent: Dec. 8, 2009

(54) METHODS AND SYSTEMS FOR PROVIDING OFF-CARD DISK ACCESS IN A TELECOMMUNICATIONS EQUIPMENT SHELF ASSEMBLY

(75) Inventors: Thomas L. Bonds, Jr., Raleigh, NC (US); Jennifer Warfel, Raleigh, NC (US); Erick Thomas Swanson, Cary, NC (US)

(73) Assignee: Tekelec, Morrisville, NC (US)

( * ) Notice: Subject to any disclaimer, the term of this patent is extended or adjusted under 35 U.S.C. 154(b) by 173 days.

(21) Appl. No.: 10/987,982

(22) Filed: Nov. 12, 2004

(65) Prior Publication Data

US 2006/0105591 A1 May 18, 2006

(51) Int. Cl.
*H01R 12/16* (2006.01)
(52) U.S. Cl. .................. 361/788; 361/796; 361/798
(58) Field of Classification Search .................. 361/788, 361/796–803; 710/300–305; 439/61–65
See application file for complete search history.

(56) References Cited

U.S. PATENT DOCUMENTS

| | | | | |
|---|---|---|---|---|
| 5,112,691 A | * | 5/1992 | Briggs et al. | 428/412 |
| 6,831,831 B2 | * | 12/2004 | Bicknell et al. | 361/685 |
| 6,934,786 B2 | * | 8/2005 | Irving et al. | 710/300 |
| 6,987,673 B1 | * | 1/2006 | French et al. | 361/727 |

OTHER PUBLICATIONS

PCI Industrial Computers Manufacturers Group, Advanced TCA PICMG 3.0 Short Form Specification, pp. 1-33, Jan. 2003.

* cited by examiner

*Primary Examiner*—Tuan T Dinh
(74) *Attorney, Agent, or Firm*—Jenkins, Wilson, Taylor & Hunt, P.A.

(57) ABSTRACT

An electronic shelf assembly includes a frame having a plurality of card slots arranged in parallel to each other along an axis of the frame and a midplane having a plurality of connectors are arranged to align with the card slots. Conductive traces are connected to predetermined pins of the midplane connectors and provide point-to-point signaling pathways between midplane connectors aligned with different card slots. An application node card may reside in one of the plurality of card slots. The application node card may have an application processor, a disk controller, and an application card connector. The application card connector is adapted to interface with at least some of the pins of one of the plurality of midplane connectors. A disk storage card may reside in one of the plurality of card slots. The disk storage card may have at least one storage media unit and a disk interface connector. The storage media unit is operatively coupled to the disk interface connector and the disk interface connector is adapted to interface with at least some of the pins of one of the plurality of midplane connectors such that some of the conductive traces support communication between the disk controller on the application card and at least one storage media unit on the disk storage card.

6 Claims, 6 Drawing Sheets

METHODS AND SYSTEMS FOR PROVIDING OFF-CARD DISK ACCESS IN A TELECOMMUNICATIONS EQUIPMENT SHELF ASSEMBLY

TECHNICAL FIELD

The present invention relates to electronic circuit cards used to form backplane or midplane assemblies in electronic equipment enclosures. More particularly, the present invention provides a method and system for providing off-card disk access to application node cards in a telecommunications equipment shelf assembly.

BACKGROUND ART

It is well known to arrange telecommunications equipment in shelf assemblies. Circuit cards are removably connected to a backplane or midplane. The circuit cards are arranged in parallel to one another and are guided to be perpendicular to the backplane or midplane. Electrical connections are established between connectors on the backplane or midplane and complementary connectors on the back edge of each circuit card. Typically, the connectors include multiple pins and sockets arranged in one or more rows along part or all of the back edge of the circuit card. When a circuit card is inserted into the equipment shelf, the shelf guides provide an approximate alignment for the pins and sockets, and a precise alignment is achieved by the mating portions of the connectors.

The backplane or midplane typically provides power to each circuit card as well as electrical interconnections between circuit cards. The electrical signal assigned to each connector pin is left to the designer of the card and chassis to decide. Thus, various connector pin assignments, or pin-outs, have been developed, both industry standard and proprietary. For example, the PCI Industrial Computer Manufacturers Group (PICMG) 3.0 specification defines an open architecture whereby circuit cards from different manufacturers can interoperate within a shelf assembly. The PICMG specification defines the pinout and function of the various connectors used to connect a circuit card to the midplane of a shelf assembly.

FIG. 1 is a side view of the basic elements of a PICMG 3.0 compliant circuit card assembly. Front board 101 includes the electrical components required to perform a desired function or application and has connectors required to interface with the shelf backplane or midplane 103. The PICMG standard defines three connector zones. Zone 1 provides power connections and a shelf management interface, Zone 2 provides the data transport interface, and Zone 3 supports a user-defined input/output interconnect. Midplane 103 has connector interfaces for the Zone 1 and Zone 2 connectors. Rear transition module 105 provides user defined input and output connectivity between the Zone 3 connector on the front board 101 and external systems or devices.

Shelf assemblies permit the deployment of several application cards in a comparatively small space. In some instances, the electrical components required to perform a desired function cannot fit in the physical space allocated to a slot in a shelf assembly. This is particularly true in applications that require access to large databases, such as certain telecommunications applications, where an associated database is stored on a dedicated disk. In order to accommodate the dedicated disk, a single application card may occupy the physical space of two slots in the shelf assembly. The application card occupies one slot and interfaces with the midplane. The dedicated disk occupies the physical space of the adjacent slot, but may be mechanically supported by the application card and electrically connected to the application card rather than the midplane. In other implementations, the application card may occupy a single slot in the shelf assembly and the dedicated disk may occupy an adjacent slot. In this configuration, the dedicated disk may derive power from the midplane, but access from the associated application card is provided by an external cable. Both of these configurations require that the dedicated disk occupy a slot physically adjacent to the application card, which may not be possible in all situations. In addition, the external cable may cause undesired electromagnetic emissions as well as a potential connectivity failure point.

Accordingly there is a need to provide a system and method that allows access to an off-card storage device while not requiring that the off-card storage device be physically adjacent to the application card or connected using an external cable.

DISCLOSURE OF THE INVENTION

According to one aspect of the subject matter described herein, a system for off-card disk access in a telecommunications equipment shelf assembly is provided. The telecommunications equipment shelf assembly includes a frame having a plurality of card slots arranged in parallel to each other along an axis of the frame. A midplane having a plurality of connectors arranged in parallel along an axis of the midplane is affixed to the frame such that the axis of the midplane coincides with the axis of the frame. The connectors on the midplane are arranged to align with the card slots. Conductive traces are connected to predetermined pins of the midplane connectors and provide point-to-point signaling pathways between midplane connectors aligned with different card slots. An application node card may reside in one of the plurality of card slots. The application node card may have an application processor, a disk controller, and an application card connector. In one exemplary implementation, the application processor is operatively coupled to the disk controller and the disk controller is operatively coupled to the application card connector. The application card connector is adapted to interface with at least some of the pins of one of the plurality of midplane connectors. A disk storage card may reside in one of the plurality of card slots. The disk storage card may have at least one storage media unit and a disk interface connector. The storage media unit is operatively coupled to the disk interface connector and the disk interface connector is adapted to interface with at least some of the pins of one of the plurality of midplane connectors such that some of the conductive traces support communication between the disk controller on the application card and at least one storage media unit on the disk storage card.

According to another aspect of the subject matter described herein, an electronic equipment assembly is provided. The electronic equipment assembly includes a midplane having a plurality of conductors. The electronic equipment assembly includes a first application card adapted to interface with the midplane. The electronic equipment assembly further includes a second application card adapted to interface with the midplane, wherein the first application card and the second application card are connected via the midplane. The electronic equipment assembly further includes a disk card adapted to interface with the midplane. The disk card is connected to the first and second application cards via the midplane using at least one conductor on the midplane that is not used for communication between the first and second application card. The first application card, the second application card, and the disk card are components of a telecommunications signaling node. At least one of the first and second application card includes a telecommunications application that accesses a database on the disk card using the at least one conductor.

According to another aspect, the subject matter described herein includes a method for providing off-card disk access in an electronic equipment assembly. The method includes connecting a first application card to a midplane in an electronic equipment assembly. The method further includes connecting a second application card to the first application card via the midplane. The method further includes connecting a disk card to the first and second application cards via the midplane using at least one conductor on the midplane that is not used from communication between the first and second application cards. The first application card, the second application card, and the disk card are components of a telecommunications signaling node. At least one of the first and second application cards includes a telecommunications application that accesses a database stored on the disk card via the at least one conductor.

Accordingly, it is a object of the invention to provide access in an electronic shelf assembly from an application card to a disk storage card. Conductive traces on the midplane provide the communication pathway between the application card and the disk storage card. Thus, the application card may access a disk storage card located in an adjacent or non-adjacent card slot without needing a secondary external connector.

Some of the objects of the invention having been stated hereinabove, and which are addressed in whole or in part by the present invention, other objects will become evident as the description proceeds when taken in connection with the accompanying drawings as best described hereinbelow.

DETAILED DESCRIPTION OF THE INVENTION

The present invention provides a system and method for off-card disk access in a telecommunications equipment shelf assembly. An application processor on an application card in one slot of a shelf assembly may access data stored on a disk storage card located in another slot in the shelf assembly. Signals between the application processor and storage disk are transported using signal traces of the shelf assembly backplane.

Figure 1:
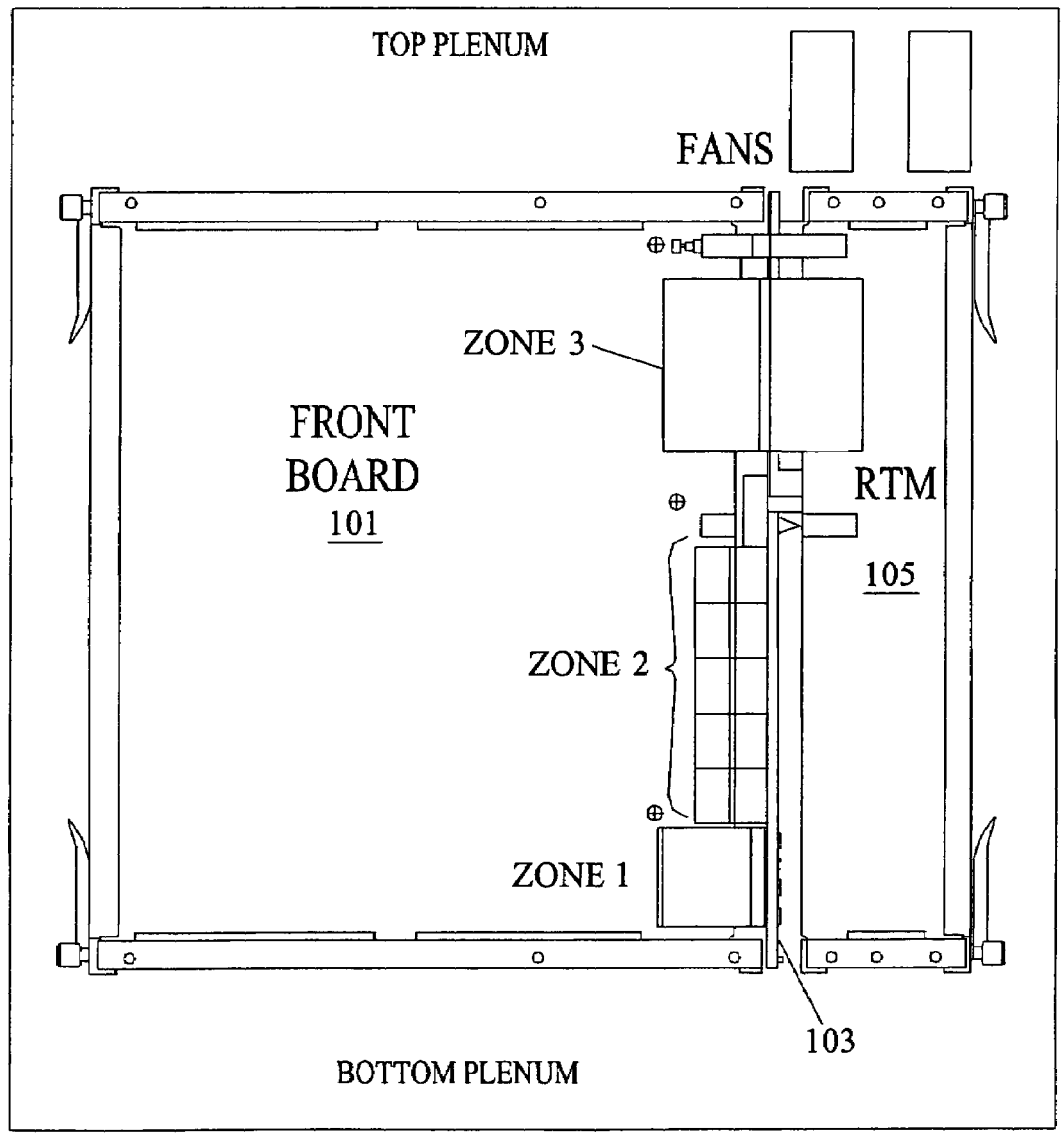
FIG. 1 is a side view of the basic elements of a PICMG 3.0 compliant circuit card assembly.
Figure 2:
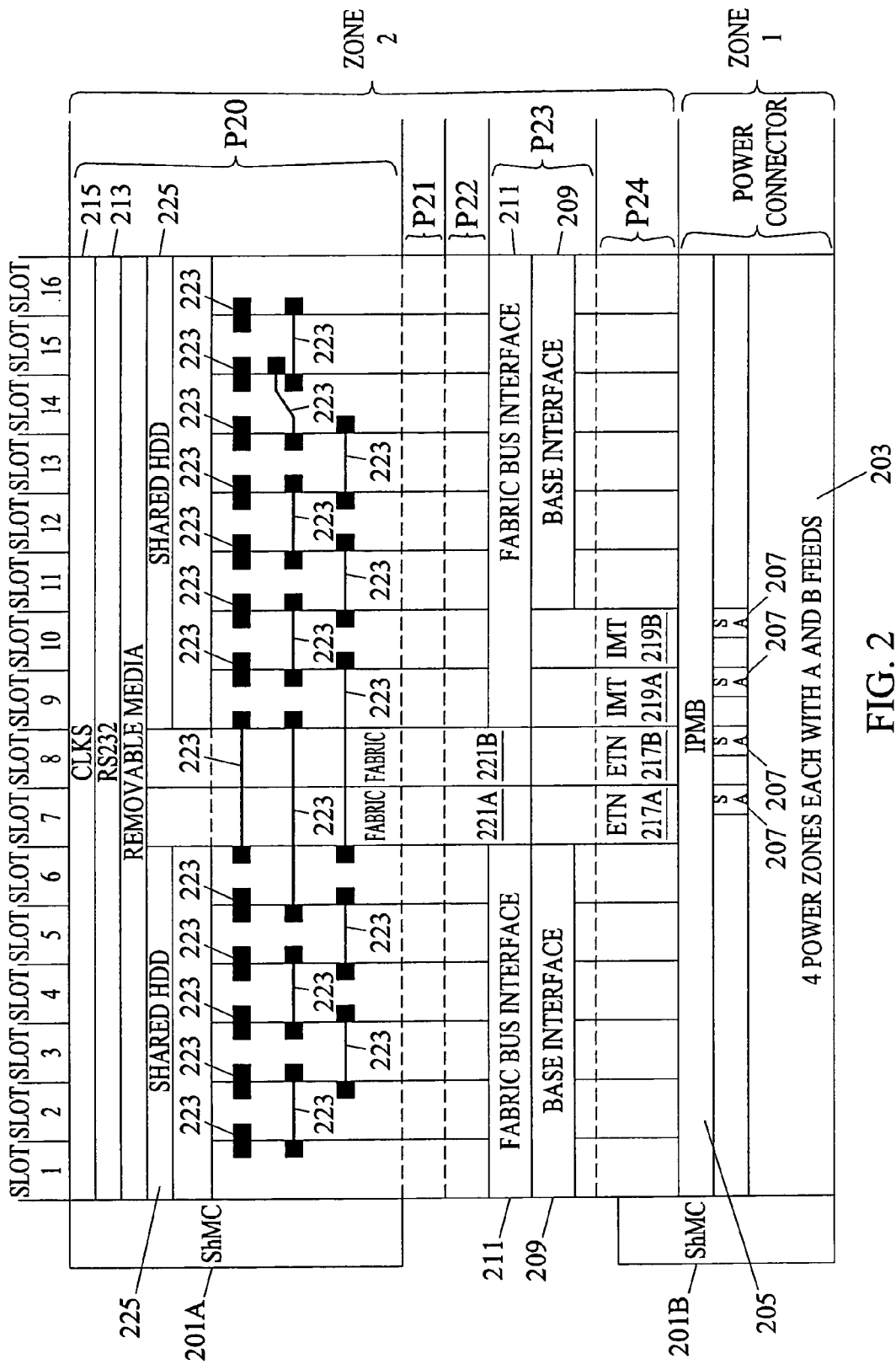
FIG. 2 is a block diagram of a midplane of a PICMG 3.0 compatible shelf assembly in accordance with an embodiment of the subject matter described herein.

FIG. 2 is a block diagram of a midplane of a PICMG 3.0 compatible shelf assembly in accordance with an embodiment of the subject matter described herein. While the method and systems for off-card disk access presented herein are described with reference to a PICMG 3.0 compatible shelf, these methods and systems may be used with other suitable electronic equipment shelf assemblies, including telecommunications equipment shelf assemblies, without departing from the scope of the subject matter described herein.

Referring to FIG. 2, the shelf assembly provides seventeen card slots arranged in parallel along the midplane. Shelf assemblies typically provide a card slot for a shelf controller and the remaining sixteen slots are available for user devices. The PICMG standard provides for redundant shelf management controller (ShMC) cards 201A and 201B having a management interface to each card slot in the shelf. The ShMC card defined by PICMG is a half-height card, thus both ShMC cards may reside in portions of the same physical slot thereby providing redundancy without reducing the number of available application card slots.

As previously noted, the midplane supports the connectivity for Zone 1 and Zone 2. Zone 1 provides access to a power bus 203 and supports an interface to a redundant management channel 205 from the ShMC to each slot. Power bus 203 may provide access from each slot to at least one power supply. Management channel 205 may be used by various cards in a shelf to obtain initialization information and to conduct management functions, such as card diagnostics. Each card in the shelf may include an intelligent platform management controller (IPMC) that communicates with the ShMC. Zone 1 may also provide a shelf address 207, which may be used in conjunction with other information to identify and/or assign a unique address to each application card in a multi-shelf system.

Zone 2 supports clock and/or data transport across four separate interfaces. These interfaces include a base interface 209, a fabric interface 211, an update channel interface 213, and a synchronization clock interface 215. The base interface 209 may support 10/100/1000Base-T Ethernet connections between application cards in a shelf. Each application node slot may have a single, point-to-point base channel connection to each of the two base hub slots 217A and 217B. The base interface 209 may also support other Ethernet-based services, such as Tekelec's proprietary Inter-processor Message Transport (IMT) bus supported by IMT hub cards 219A and 219B.

The fabric interface 211 supports non-Ethernet-based communication between cards. Redundant fabric interface cards 221A and 221B may be provided in the shelf assembly. Each fabric interface card may include configuration information for application cards residing in the remaining card slots, and facilitate non-Ethernet-based communication between application cards. As shown in FIG. 2, redundant fabric interface cards 221A and 221B reside in slot 7 and slot 8. It should be appreciated that non-PICMG compatible shelf architectures may not require the use of fabric interface cards, thus making these slots available for use by application cards.

Each front board 101 (not shown in FIG. 2) may access the Zone 2 interfaces through a connector array including up to five connectors, forming the Zone 2 connector area. Front boards and midplane slots may be equipped with a complete set or may include a subset of the five possible connectors. In FIG. 2, the Zone 2 connectors are labeled P20-P24. Each connector may include pins that connect to corresponding conductors on the midplane. In FIG. 2, each connector is illustrated functionally by sharing the signals or devices that may use each connector.

In accordance with the PICMG standard, connector P20 supports the signals of the synchronization clock interface 215, the update channel interface 213, and a portion of the fabric interface 211. Also according to the PICMG standard, the remaining fabric interface 211 signals reside on connectors P21, P22, and a portion of P23. The number of fabric interface signals that need to be supported depends upon the fabric topology implemented by the midplane. The PICMG standard defines three midplane topologies. A dual star topology requires two dedicated hub slots for hub boards to be inserted. Each hub slot has a channel connection to each node slot in the midplane. A dual-dual star midplane topology is similar to the dual star topology and is capable of supporting two distinct and redundant switching fabrics across the midplane. A full mesh topology provides a direct data path between each board in the system. A full mesh midplane requires a larger number of midplane trace routes and connector pin assignments per slot than either the dual star or dual-dual star configurations, but offers several advantages such as system scalability, system redundancy, and physical efficiency.

In an embodiment of the subject matter described herein, fabric interface 211 may be configured to implement a dual-star topology. Rather than using portions of connectors P21, P22, and P23 to implement the dual-star topology, in the example illustrated in FIG. 2, the dual-star topology may be implemented via fabric bus interface 211, which occupies pins of connector P23. Using this topology, interface pins in connectors P20, P21, and P22 are made available for other uses. For example, the additional midplane pins may be used to provide off-card disk access.

In the example illustrated in FIG. 2, pins assigned for use by the fabric interface 211 but not used by the dual-star topology are used to provide access to off-card storage media. In particular, each application card slot has a point-to-point connection bus segment 223 to each adjacent card slot and each next-adjacent (i.e., second-adjacent) card slot through which an application card in a card slot may access storage media on a disk card located in any of the adjacent or next-adjacent card slots. Each point-to-point connection bus segment 223 may be formed by one or more electrically conductive pathways on or in the midplane between predetermined connector pins. The number of connector pins and conductive pathways for each point-to-point connection bus segment 223 depends, for example, on the number and character (i.e., either balanced or unbalanced) of signals required by the media storage interface.

As shown in FIG. 2, point-to-point connection bus segments 223 provide connectivity between a card slot and its adjacent and next-adjacent card slots. For example, slot 1 and slot 2 are connected by a point-to-point connection bus segment 223, slot 2 and slot 3 are connected by another point-to-point connection bus segment 223, and so on. Similarly, next-adjacent card slots are connected using point-to-point connection bus segments 223. For example, slot 1 and slot 3 are connected by a point-to-point connection bus segment 223, slot 2 and slot 4 are connected by another point-to-point connection bus segment 223, and so on. Thus, each card slot may access up to four other card slots that may contain disk cards.

In addition to adjacent and next-adjacent disk card access, the subject matter described herein provides for access to a shared disk array. The shared disk array may occupy a slot in the shelf assembly and may include multiple disks on a single card. Each disk may be designated for access by an individual application card or the disks may be configured to support simultaneous or near-simultaneous access by several application cards. The shared disk cards may be accessed by a shared disk bus 225. Shared disk bus 225 provides connections between each application card slot and each of the shared disk slots. In one embodiment, slot 15 and slot 16 are allocated for the shared disk cards. Thus, each application card slot has a midplane connection to slot 15 and slot 16.

Figure 3:
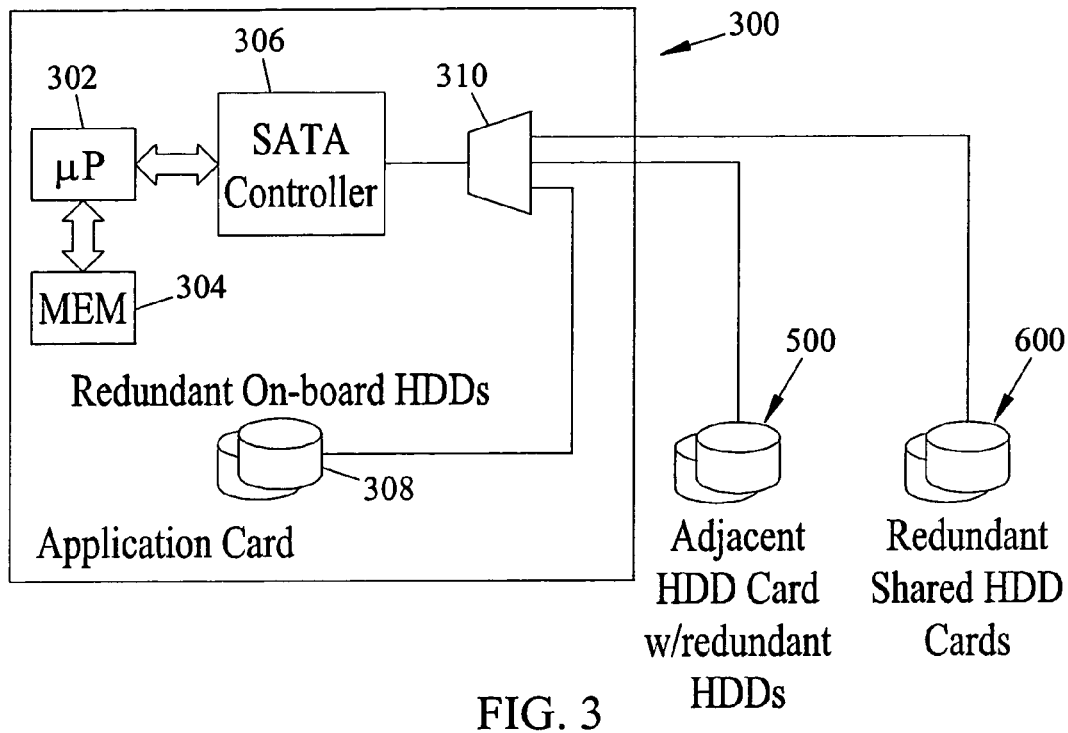
FIG. 3 is a block diagram of an application card having off-card disk access in accordance with embodiments of the subject matter described herein.

FIG. 3 is a block diagram of an application card having off-card disk access in accordance with embodiments of the subject matter described herein. In FIG. 3, application card 300 includes an application processor 302 and associated memory 304. A disk controller 306 provides an interface between application processor 302 and disk drives 308, 500, and 600 that are accessible to the application processor 302. Disk controller 306 may use a serial interface, such as Serial ATA, version 1 (SATA-I), to control the disk drives 308, 500, and 600. Disk controller 306 may be selectively attached to an on-card disk 308 and at least one off-card disk 500 and 600 through a multiplexer 310. FIG. 3 depicts an implementation based on SATA-I, which supports the attachment of one disk at a time. Multiplexer 310 may be connected to predetermined pins on the Zone 2 connector array.

Figure 4:
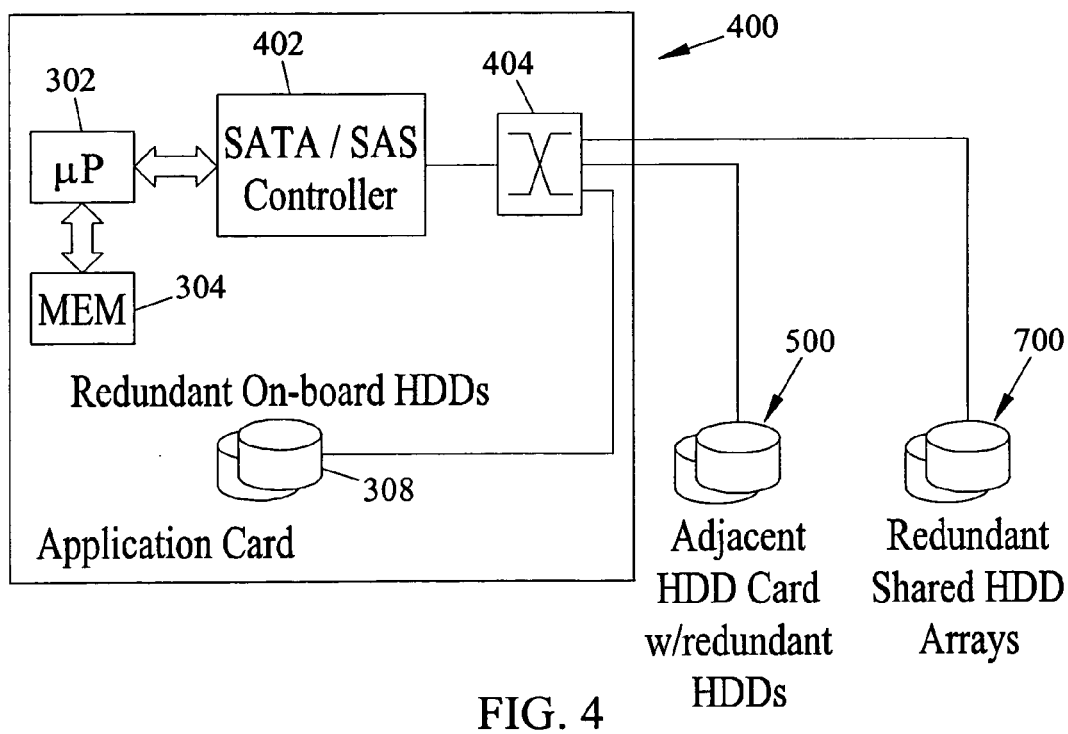
FIG. 4 is a block diagram of an application card having off-card disk access in accordance with another embodiment of the subject matter described herein.

FIG. 4 is a block diagram of an application card having off-card disk access in accordance with another embodiment of the subject matter described herein. Application card 400 includes an application processor 302 and associated memory 304. A disk controller 402 provides an interface between the application processor 302 and disk drives 308, 500, and 700 that are accessible to the application processor 302. The disk controller 402 may use a serial interface, such as Serial ATA, version 2 (SATA-II) or Serial Attached SCSI (SAS), to control the disk drives 308, 500, and 700. The disk controller 402 may be attached to more than one off-card disk 500 and 700 or to an on-card disk 308 and at least one off-card disk 500 and 700 through a switch matrix 404. FIG. 4 depicts an implementation based on either SATA-II or SAS, which supports the simultaneous attachment of more than one disk to the disk controller through switch matrix 404. Thus, switch matrix 404 may interface with a shared disk array 700 to provide access to multiple disks on a single card. Switch matrix 404 may be connected to predetermined pins on the Zone 2 connector array. It should be appreciated that the SATA-II and SAS standards are backward compatible with SATA-I. Thus, SATA/SAS disk controller 402 may be used to control disks that are SATA-I, SATA-II, or SAS compatible, whereas SATA-I disk controller 306 may be used to control disks that are SATA-I compatible.

Figure 5:
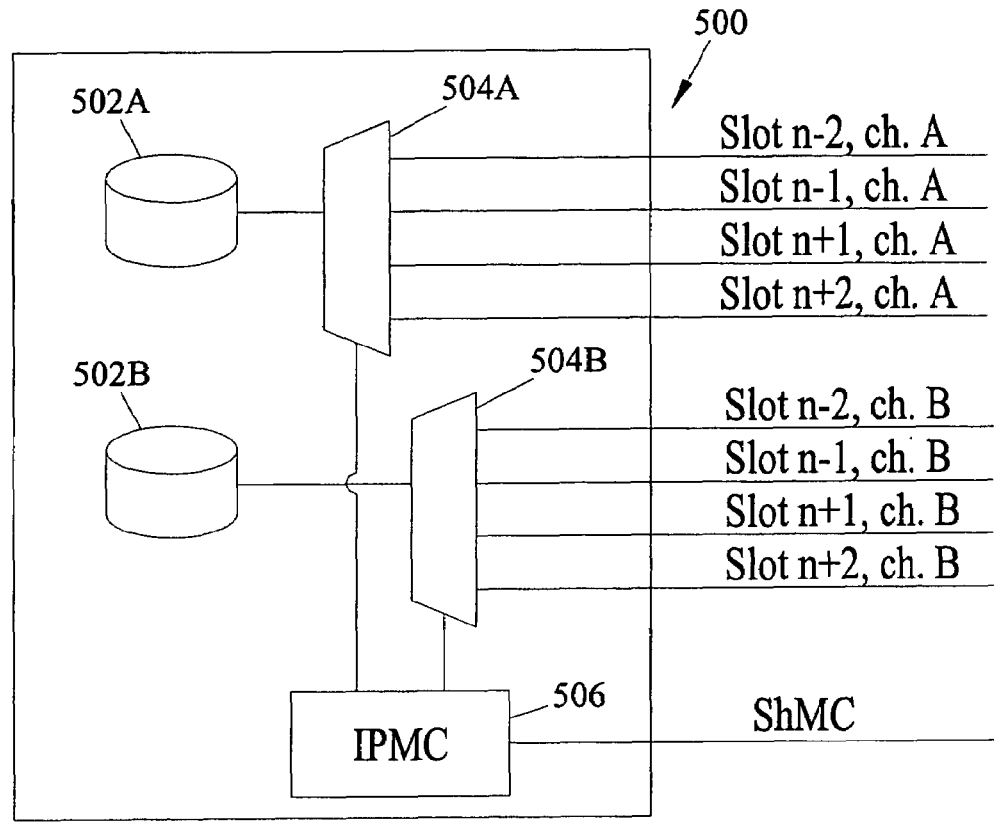
FIG. 5 is a block diagram of a disk card having redundant disks that may be accessed, via the midplane, by application cards placed in adjacent or next-adjacent slots in accordance with embodiments of the subject matter described herein.
Figure 6:
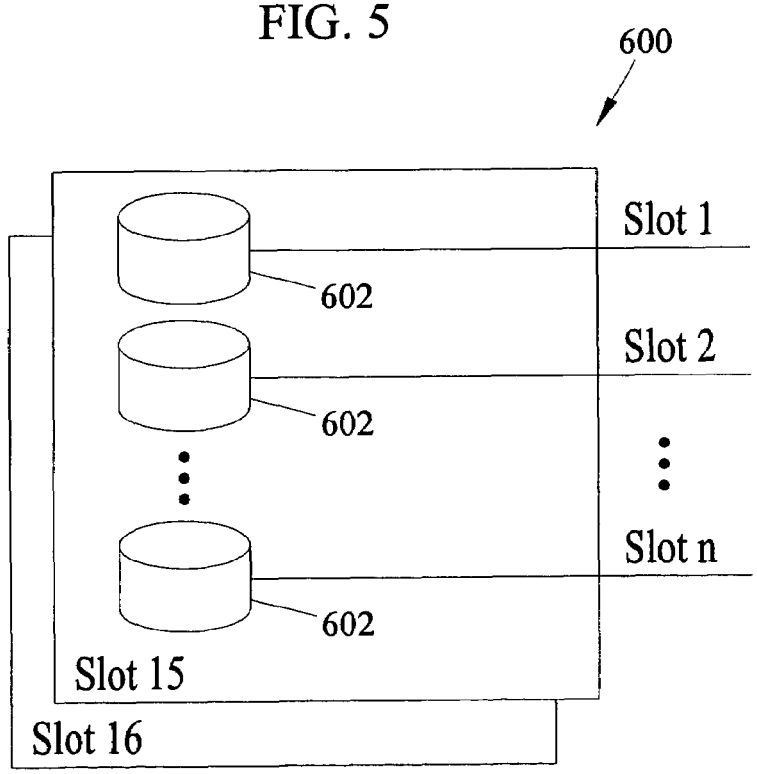
FIG. 6 is a block diagram of a disk card having multiple disks that may be accessed by application cards attached to the midplane in accordance with an embodiment of the subject matter described herein.

FIGS. 5 and 6 are block diagrams of disk card configurations capable of providing SATA-I compliant off-card disk access to an application card in accordance with embodiments of the subject matter described herein. Disk card 500 shown in FIG. 5 provides redundant disks 502A and 502B, which may be accessed, via the midplane, by application cards placed in adjacent or next-adjacent slots. Multiplexers 504A and 504B interface with the midplane and provide access to the midplane signals. Multiplexers 504A and 504B may automatically scan a set of predetermined card slots to locate a disk with which to interface or may be assigned a card slot to interface with, for example, via an intelligent platform management controller (IPMC) 506 that communicates with the ShMC. IPMC 506 may employ a search algorithm to discover an application card located in one of the adjacent or next-adjacent slots and configure multiplexers 504A and 504B to interface with the discovered application card. Each disk 502A and 502B may be accessed by disk controller 306 or 402 located on the respective application card 300 or 400 through application card multiplexer 310 or switch matrix 402.

Disk card 600 shown in FIG. 6 provides multiple disks 602 that may be accessed by application cards attached to the midplane. Each disk 602 may be configured to interface with a predetermined card slot. The disk card 600 may be deployed in pairs to provide redundancy.

Figure 7:
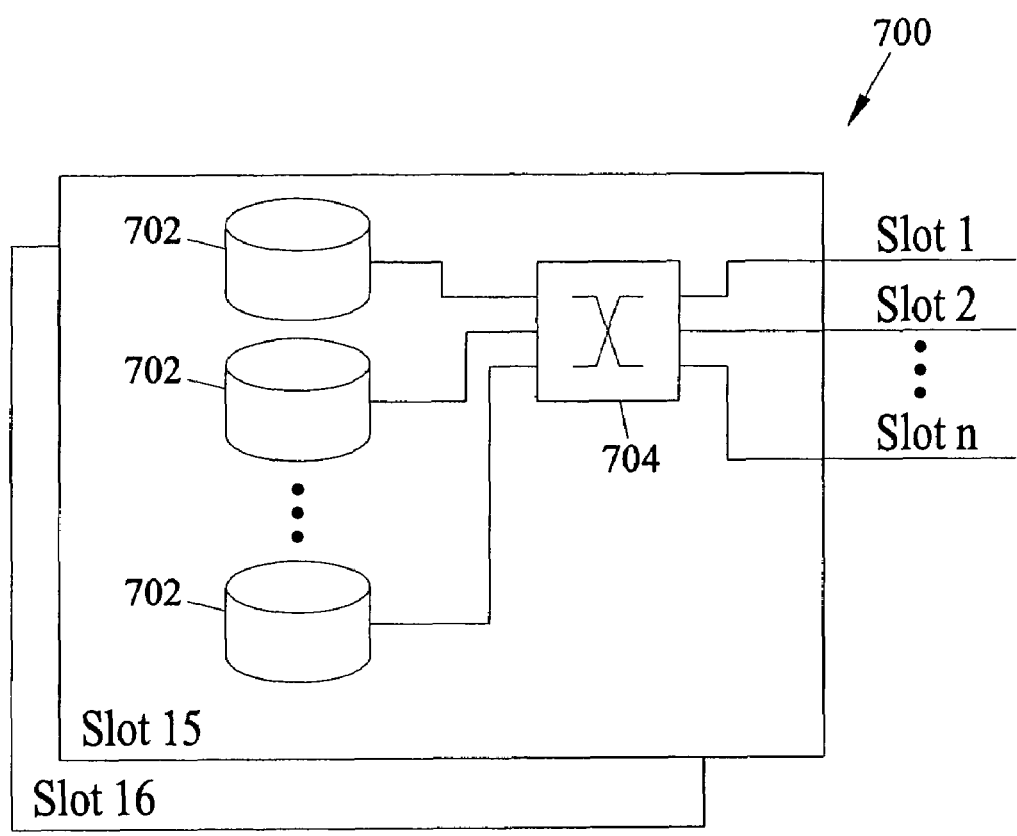
FIG. 7 is a block diagram of a disk card configuration capable of providing SATA-II and SAS compliant off-card disk access to an application card in accordance with an embodiment of the subject matter described herein.

FIG. 7 is a block diagram of a disk card 700 configuration capable of providing SATA-II and SAS compliant off-card disk access to an application card in accordance with an embodiment of the subject matter described herein. In FIG. 7, disks 702 may be accessed by application cards connected to the shared disk bus, as discussed above. Disk card switch matrix 704 provides simultaneous access to disks 702 in the shared disk array. An application card in a card slot may simultaneously access multiple disks 702 or disks 702 may be simultaneously accessed by application cards in different card slots. The shared disks may enable a database to be shared among multiple application processors, allowing for a distributed database solution. In addition, the shared disks may be used to enable hot stand-by, where the stand-by card always has access to the database and in the event of a failover, does not have to execute a synchronization procedure.

Figure 8:
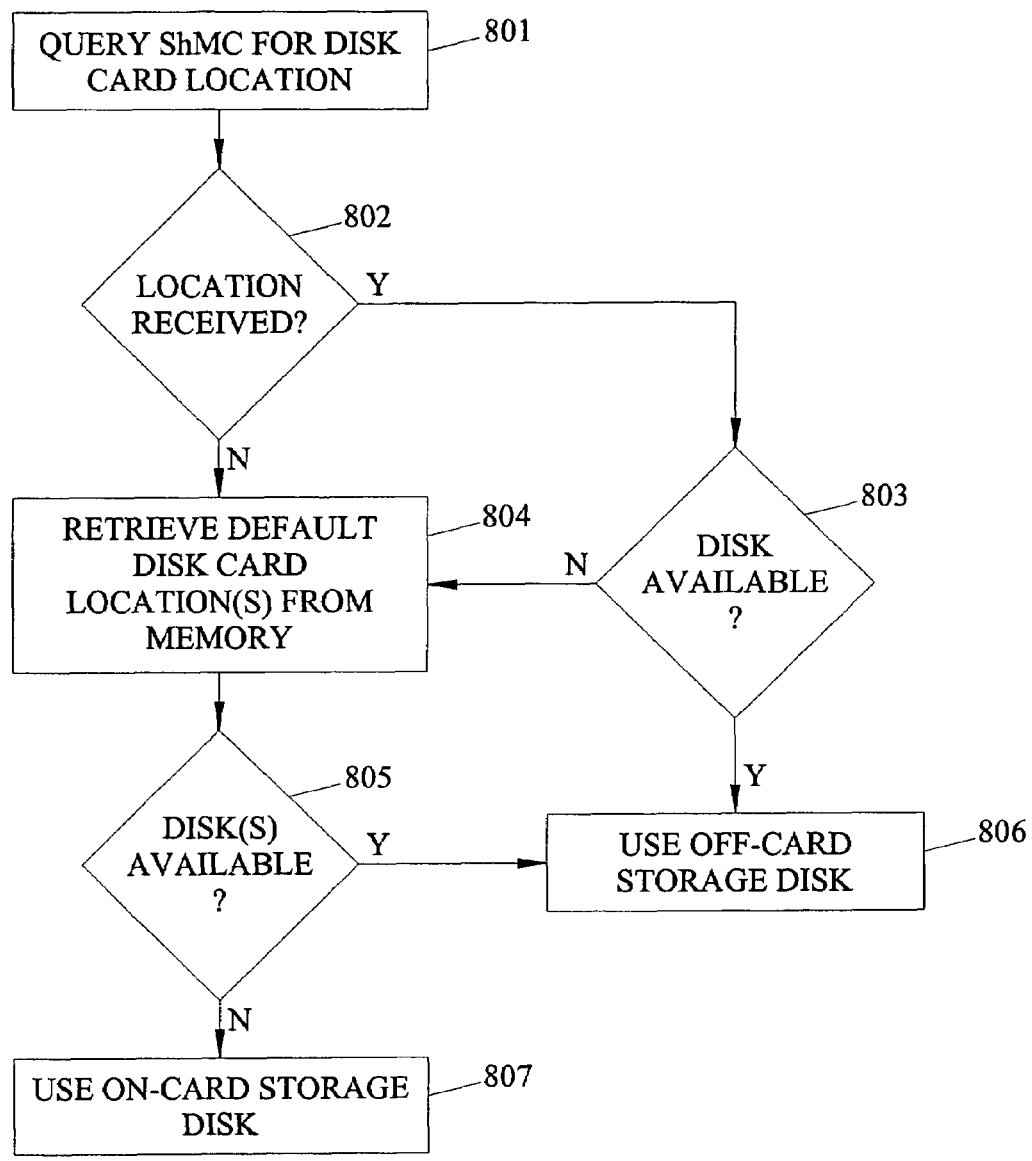
FIG. 8 is a flow diagram of a method in an application card for selecting a storage disk in accordance with an embodiment of the subject matter described herein.

FIG. 8 is a flow diagram of a method in an application card for selecting a storage disk in accordance with an embodiment of the subject matter described herein. In step 801, an application card queries a management card to determine the location of a disk card assigned to the application card. The query may be sent using management channel 205 and the destination management card may be ShMC 201A or 201B, fabric interface card 221A or 221B, or another card. If, in step 802, the location of a disk card is received, the application card may determine whether a disk on the disk card is available, for example, by attempting to access the disk. If, in step 803, the application card determines that the disk is not available, the application card may, in step 804, retrieve default disk card locations from, for example, application card memory 304. Application card memory 304 may include more than one default disk card location. Accordingly, in step 805, the availability of storage disks at each disk card location may be evaluated. If an off-card storage disk is found to be available in either step 803 or 805, the off-card storage disk is used by the application card (step 806). If, in step 805, an off-card storage disk is not found, the application card may use an on-card storage disk (step 807).

Accordingly, the subject matter described herein provides a system and method for off-card disk access in a telecommunications equipment shelf assembly. An application processor on an application card in one slot of a shelf assembly may access data stored on a disk storage card located in another slot in the shelf assembly. Signals between the application processor and storage disk are transported using signal traces of the shelf assembly backplane. An application card may access a predetermined off-card storage disk or may receive an instruction from a shelf manager to connect to a storage disk located in a specified card slot.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. An electronic equipment assembly comprising:
   (a) a midplane having a plurality of conductors;
   (b) a first application card adapted to interface with the midplane;
   (c) a second application card adapted to interface with the midplane, wherein the first application card and the second application card are connected via the midplane; and
   (d) a disk card adapted to interface with the midplane, the disk card being connected to the first and second application cards via the midplane using at least one conductor on the midplane that is not used for communication between the first and second application cards;
   wherein the first application card, the second application card, and the disk card are components of a telecommunications signaling node and wherein at least one of the first and second application cards includes a telecommunications application that accesses a database on the disk card using the at least one conductor.

2. The electronic equipment assembly of claim 1 wherein the first and second application cards are connected to a plurality of third application cards via the midplane to form a dual-star topology and wherein the disk card is connected to at least one of the application cards via midplane conductors not used for the dual star topology.

3. The electronic equipment assembly of claim 1 wherein the midplane includes a plurality of card slots and wherein the at least one conductor through which the first and second application cards connect to the disk card includes point to point traces between adjacent card slots.

4. A method for providing off-card disk access in an electronic equipment assembly, the method comprising:
   (a) connecting a first application card to a midplane in an electronic equipment assembly;
   (b) connecting a second application card to the first application card via the midplane; and
   (c) connecting a disk card to the first and second application cards via the midplane using at least one conductor on the midplane that is not used for communication between the first and second application cards;
   wherein the first application card, the second application card, and the disk card are components of a telecommunications signaling node and wherein at least one of the first and second application cards includes a telecommunications application that accesses a database on the disk card using the at least one conductor.

5. The method of claim 4 wherein the first and second application cards are connected to a plurality of third application cards via the midplane to form a dual-star topology and wherein the disk card is connected to at least one of the application cards via midplane conductors not used for the dual star topology.

6. The method of claim 4 wherein connecting a disk card to the first and second application cards includes connecting adjacent card slots of the midplane via point to point traces between the adjacent card slots.

* * * * *